(12) United States Patent
Sakakibara

(10) Patent No.: US 11,787,432 B2
(45) Date of Patent: Oct. 17, 2023

(54) PARKING ASSISTANCE APPARATUS

(71) Applicant: HONDA MOTOR CO., LTD., Tokyo (JP)

(72) Inventor: Naoya Sakakibara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 364 days.

(21) Appl. No.: 17/196,431

(22) Filed: Mar. 9, 2021

(65) Prior Publication Data

US 2021/0284186 A1 Sep. 16, 2021

(30) Foreign Application Priority Data

Mar. 16, 2020 (JP) .................................. 2020-045470

(51) Int. Cl.
*B60W 50/10* (2012.01)
*B60W 30/18* (2012.01)
*G08G 1/04* (2006.01)
*B60W 10/04* (2006.01)
*G08G 1/14* (2006.01)

(52) U.S. Cl.
CPC ...... *B60W 50/10* (2013.01); *B60W 30/18109* (2013.01); *G08G 1/14* (2013.01); *B60W 10/04* (2013.01); *B60W 30/181* (2013.01); *B60W 30/18063* (2013.01); *B60W 2510/08* (2013.01)

(58) Field of Classification Search
CPC .......... B60W 50/10; B60W 30/18109; B60W 2510/18; B60W 10/04; B60W 30/18063; B60W 30/181; G08G 1/14
See application file for complete search history.

(56) References Cited

U.S. PATENT DOCUMENTS

| 11,023,511 B1* | 6/2021 | Fletcher ................ G06F 16/338 |
| 2013/0038715 A1 | 2/2013 | Ichikawa |
| 2014/0039728 A1 | 2/2014 | Imazu et al. |
| 2014/0168435 A1* | 6/2014 | Tuhro ..................... B60Q 1/48 |
| | | 348/148 |

(Continued)

FOREIGN PATENT DOCUMENTS

| CN | 102858584 A | 1/2013 |
| CN | 103492219 A | 1/2014 |

(Continued)

OTHER PUBLICATIONS

Office Action dated Nov. 9, 2021, issued in counterpart JP Application No. 2020-045470, with English Translation. (6 pages).

(Continued)

*Primary Examiner* — Behrang Badii
*Assistant Examiner* — Jay Khandpur
(74) *Attorney, Agent, or Firm* — WHDA, LLP

(57) ABSTRACT

When a vehicle is parked while the position of a power-receiving unit with respect to a power-transmitting unit is adjusted, an ECU in a parking assistance apparatus implements first assistance control if it is determined that the power-receiving unit is within a first range and implements second assistance control for controlling the vehicle such that a displacement of the vehicle per unit time is less than that during the first assistance control if it is determined that the power-receiving unit is within a second range.

12 Claims, 7 Drawing Sheets

(56) References Cited

U.S. PATENT DOCUMENTS

| | | |
|---|---|---|
| 2015/0239361 A1 | 8/2015 | Niizuma |
| 2016/0332575 A1 | 11/2016 | Fukushima |
| 2017/0001665 A1 | 1/2017 | Tsukamoto |
| 2018/0056988 A1* | 3/2018 | Heil, Jr. .................. E05F 15/70 |
| 2018/0099661 A1* | 4/2018 | Bae .................... B62D 15/0285 |
| 2018/0281610 A1 | 10/2018 | Saita |
| 2019/0092343 A1* | 3/2019 | Hoshikawa ........... B60W 50/10 |
| 2021/0162986 A1* | 6/2021 | Sakai .................... B60K 35/00 |

FOREIGN PATENT DOCUMENTS

| | | |
|---|---|---|
| CN | 104769807 A | 7/2015 |
| CN | 105934649 A | 9/2016 |
| CN | 108688488 A | 10/2018 |
| JP | 2011-015549 A | 1/2011 |
| JP | 2012-5243 A | 1/2012 |
| JP | 2014-035746 A | 2/2014 |
| JP | 6060195 B2 | 1/2017 |
| JP | 2017-093153 A | 5/2017 |
| WO | 2011/132271 A1 | 10/2011 |
| WO | WO-2011158107 A1 * | 12/2011 ............ B60L 11/005 |

OTHER PUBLICATIONS

Office Action dated Jun. 22, 2023, issued in counterpart CN Application No. 202110144525.2, with English Translation. (7 pages).

\* cited by examiner

PARKING ASSISTANCE APPARATUS

CROSS REFERENCES TO RELATED APPLICATIONS

The present application claims priority under 35 U.S.C. § 119 to Japanese Patent Application No. 2020-045470, filed Mar. 16, 2020, entitled "Parking Assistance Apparatus." The contents of this application are incorporated herein by reference in their entirety.

TECHNICAL FIELD

The present disclosure relates to a parking assistance apparatus that assists in parking a vehicle.

BACKGROUND

A known parking assistance apparatus is disclosed in Japanese Patent No. 6060195. When an electric vehicle is charged in a non-contact manner, the parking assistance apparatus assists in parking the vehicle such that the position of a charging pad in the vehicle with respect to a power supply pad in a power supply device is readily adjustable.

The parking assistance apparatus controls changes in creep torque characteristics of the vehicle with an accelerator off to assist in parking the vehicle. Specifically, a driver requests non-contact charging and a change in a movement characteristic of the vehicle by operating a non-contact-parking switch and a characteristic-changing switch, and the changes in the creep torque characteristics are controlled when a vehicle speed is less than a predetermined speed.

SUMMARY

As for the existing parking assistance apparatus described above, requirements for controlling the changes in the creep torque characteristics are that the accelerator is off, and the driver performs a switch operation. Accordingly, while the accelerator is on, or the driver performs no switch operation, the changes in the creep torque characteristics are not controlled, and there is no assistance in parking the vehicle. For this reason, in the case where the driver performs a rough driving operation, or the driving performance of the driver is low, position adjustment during parking is difficult, and the accuracy of the position adjustment decreases.

The present application describes, for example, a parking assistance apparatus that facilitates position adjustment during parking and that improves the accuracy of the position adjustment even in the case where a driver performs a rough driving operation, and the driving performance of the driver is low.

A parking assistance apparatus 1 according to a first aspect includes a relative-position-obtaining unit (an ECU 10, a positioning sensor 15, STEP 13) that obtains relative positions of a power-receiving unit 20 that is mounted on a vehicle 2 and a power-transmitting unit 31 that transmits power to the power-receiving unit 20 in a non-contact manner, and a parking assistance control unit (the ECU 10, STEP 1 to STEP 8) that implements parking assistance control for assistance in parking, based on the relative positions when the vehicle 2 is stopped while the position of the power-receiving unit 20 with respect to the power-transmitting unit 31 is adjusted. The parking assistance control unit includes a first-range-determining unit (the ECU 10, STEP 2) that determines whether the power-receiving unit 20 is within a first range A1 in which the relative positions of the power-receiving unit 20 and the power-transmitting unit 31 are obtainable, a second-range-determining unit (the ECU 10, STEP 5) that determines whether the power-receiving unit 20 is within a second range A2 in which the power-receiving unit 20 is nearer than that in the first range A1 to the power-transmitting unit 31 if the first-range-determining unit determines that the power-receiving unit 20 is within the first range A1, a first assistance control unit (the ECU 10, STEP 6) that implements, as the parking assistance control, first assistance control for controlling the vehicle 2 such that a displacement of the vehicle 2 per unit time is less than that in case where it is determined that the power-receiving unit 20 is not within the first range A1 if the first-range-determining unit determines that the power-receiving unit 20 is within the first range A1, and a second assistance control unit (the ECU 10, STEP 8) that implements, as the parking assistance control, second assistance control for controlling the vehicle 2 such that the displacement of the vehicle 2 per unit time is less than that during the first assistance control if the second-range-determining unit determines that the power-receiving unit 20 is within the second range A2.

As for the parking assistance apparatus, the relative-position-obtaining unit obtains the relative positions of the power-receiving unit that is mounted on the vehicle and the power-transmitting unit that transmits the power to the power-receiving unit in a non-contact manner, and the parking assistance control unit implements the parking assistance control for assistance in parking, based on the relative positions when the vehicle is stopped while the position of the power-receiving unit with respect to the power-transmitting unit is adjusted.

In this case, the first assistance control for controlling the vehicle such that the displacement of the vehicle per unit time is less than that in case where it is determined that the power-receiving unit is not within the first range is implemented as assistance control if the first-range-determining unit determines that the power-receiving unit is within the first range. The vehicle is automatically controlled such that the displacement of the vehicle per unit time is less than that in the case where the power-receiving unit is not within the first range when the power-receiving unit approaches the power-transmitting unit up to a location within the first range, and any driver's switch operation, for example, is not included in requirements. Consequently, the vehicle is parked while influence caused in the case where the driver performs a rough driving operation, or the driving performance of the driver is low is inhibited during the first assistance control.

In addition, the second assistance control for controlling the vehicle such that the displacement of the vehicle per unit time is less than that during the first assistance control is implemented as assistance control if the second-range-determining unit determines that the power-receiving unit is within the second range. That is, the vehicle is automatically controlled such that the displacement of the vehicle per unit time is less than that during the first assistance control when the power-receiving unit approaches the power-transmitting unit up to a location within the second range in which the power-receiving unit is nearer than that in the first range to the power-transmitting unit. Consequently, the influence caused in the case where the driver performs a rough driving operation, or the driving performance of the driver is low can be inhibited during the second assistance control more than during the first assistance control, and the vehicle can be parked while the position of the power-receiving unit with respect to the power-transmitting unit is readily adjusted. In the above manner, the accuracy of position adjustment during parking can be improved ("obtaining a relative position" in the present disclosure is not limited to directly detecting the relative position by using, for example, a sensor but involves presuming or calculating the relative position, based on various kinds of data such as image data).

According to a second aspect, the parking assistance apparatus according to the first aspect may further include a report unit (the ECU 10, an output interface 27, STEP 25, STEP 36) that reports that the first assistance control or the second assistance control is implemented to the cabin of the vehicle 2 during the first assistance control or the second assistance control.

As for the parking assistance apparatus, the report unit reports that the first assistance control or the second assistance control is implemented to the cabin of the vehicle during the first assistance control or the second assistance control. Accordingly, the driver of the vehicle does not feel strange when the displacement of the vehicle per unit time decreases due to the first assistance control or the second assistance control. Consequently, a high degree of customer satisfaction can be ensured.

According to a third aspect, during the second assistance control, the second assistance control unit may control the vehicle 2 such that a speed VP of the vehicle 2 is in a speed range lower than that during the first assistance control (STEP 31, STEP 33) in the parking assistance apparatus 1 according to the first or second aspect.

As for the parking assistance apparatus, during the second assistance control, the vehicle is controlled such that the speed of the vehicle is in a speed range lower than that during the first assistance control. Consequently, the speed of the vehicle automatically decreases when the power-receiving unit approaches the power-transmitting unit up to a location within the second range in which the power-receiving unit is nearer than that in the first range to the power-transmitting unit, and the influence caused in the case where the driver performs a rough driving operation, or the driving performance of the driver is low can be inhibited during the second assistance control. As a result, the vehicle can be parked while the position of the power-receiving unit with respect to the power-transmitting unit is readily adjusted, and the accuracy of the position adjustment can be improved with certainty.

According to a fourth aspect, the vehicle 2 may include a brake device (a brake unit 25) that outputs braking force of the vehicle 2 in case where a driver of the vehicle 2 performs a braking operation, and during the second assistance control, the second assistance control unit may control the brake device such that an output ratio of the braking force is higher than that during the first assistance control (STEP 35) in the parking assistance apparatus 1 according to any one of the first to third aspects.

As for the parking assistance apparatus, during the second assistance control, the brake device is controlled such that the output ratio of the braking force is higher than that during the first assistance control. Consequently, the braking force automatically increases when the power-receiving unit approaches the power-transmitting unit up to a location within the second range in which the power-receiving unit is nearer than that in the first range to the power-transmitting unit. Accordingly, the influence caused in the case where the driver performs a rough driving operation, or the driving performance of the driver is low can be inhibited during the second assistance control. As a result, the vehicle can be parked while the position of the power-receiving unit with respect to the power-transmitting unit is readily adjusted, and the accuracy of the position adjustment can be improved with certainty.

According to a fifth aspect, the vehicle 2 may include an accelerator-operation-amount-obtaining unit (an accelerator position sensor 11) that obtains an accelerator operation amount (an accelerator position AP) that represents an amount of an operation of an acceleration device that is performed by a driver of the vehicle 2, and a power source (a power motor 23) that outputs driving force of the vehicle 2 depending on the accelerator operation amount, and during the second assistance control, the second assistance control unit may control the power source such that an output ratio of the driving force to the accelerator operation amount is lower than that during the first assistance control (STEP 33) in the parking assistance apparatus 1 according to any one of the first to fourth aspects.

As for the parking assistance apparatus, during the second assistance control, the power source is controlled such that the output ratio of the driving force to the accelerator operation amount is lower than that during the first assistance control. Consequently, the driving force with respect to the accelerator operation amount automatically decreases when the power-receiving unit approaches the power-transmitting unit up to a location within the second range in which the power-receiving unit is nearer than that in the first range to the power-transmitting unit. Accordingly, the influence caused in the case where the driver performs a rough driving operation, or the driving performance of the driver is low can be inhibited. As a result, the vehicle can be parked while the position of the power-receiving unit with respect to the power-transmitting unit is readily adjusted, and the accuracy of the position adjustment can be improved with certainty. In the above explanation of the exemplary embodiment, specific elements with their reference numerals are indicated. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DESCRIPTION OF THE PREFERRED EMBODIMENTS

Figure 1:
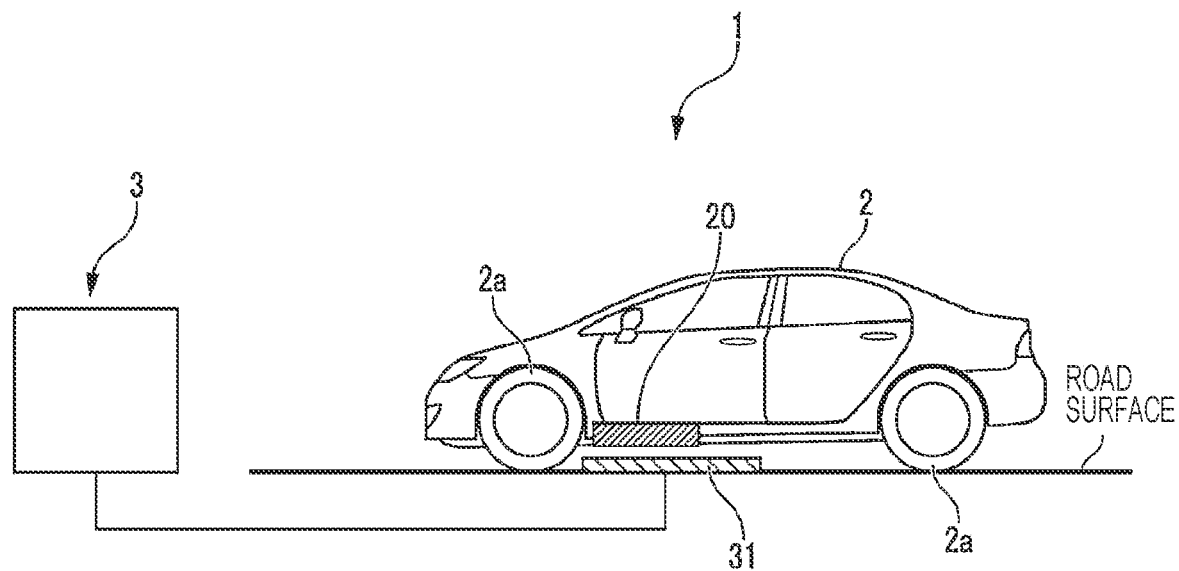
FIG. 1 schematically illustrates the structure of a power-transmitting device and a parking assistance apparatus according to an embodiment of the present disclosure.

A parking assistance apparatus 1 according to an embodiment of the present disclosure will now be described with reference to FIG. 1 to FIG. 3. When a driver (not illustrated) drives and parks a vehicle 2, the parking assistance apparatus 1 according to the present embodiment assists the driver in parking the vehicle 2 as described below.

The vehicle 2 is an electric vehicle that includes four wheels 2a (only two of them are illustrated) and uses a power motor 23 described later as a power source. When the state of charge SOC of a battery 22 described later decreases, the vehicle 2 needs to charge the battery 22.

The vehicle 2 charges the battery 22 in a non-contact manner. For non-contact charging, it is necessary to park the vehicle 2 while position adjustment is made such that a power-receiving unit 20 in the vehicle 2 has a relationship in position (see FIG. 9) with respect to a power-transmitting unit 31 in a power-transmitting device 3 at which charging can be performed as described later. Accordingly, the parking assistance apparatus 1 performs a parking assistance control process described later to improve ease of such parking.

In the following description, parking the vehicle at a position at which charging can be performed while the position of the power-receiving unit 20 with respect to the power-transmitting unit 31 is adjusted is referred to as "position adjustment parking". According to the present embodiment, a non-contact charging method is a magnetic resonance method. In this case, the non-contact charging method may be a method of using electromagnetic induction.

Figure 2:
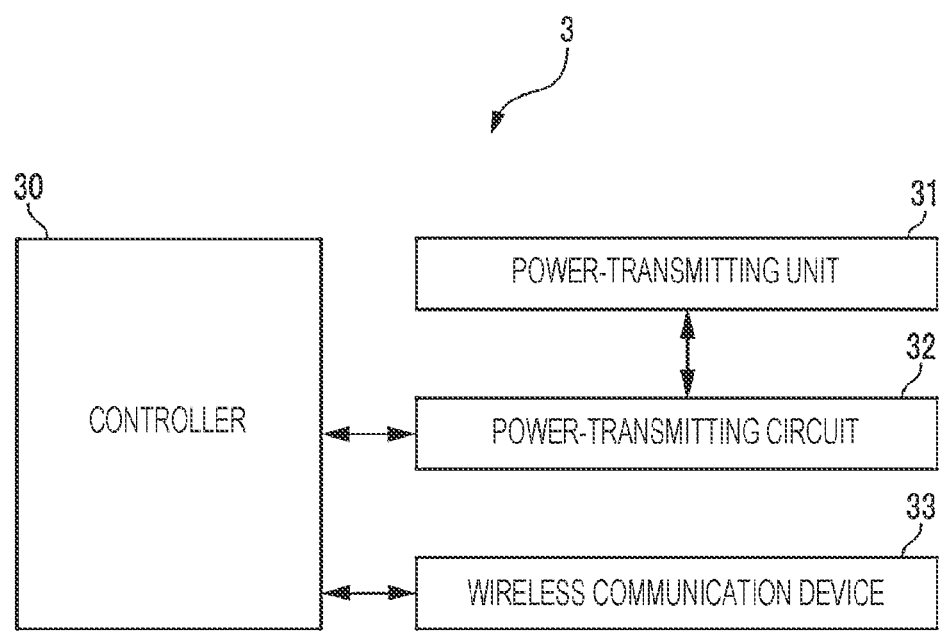
FIG. 2 illustrates a block diagram of the structure of the power-transmitting device.

As illustrated in FIG. 2, the power-transmitting device 3 includes a controller 30, the power-transmitting unit 31, a power-transmitting circuit 32, and a wireless communication device 33. The power-transmitting unit 31 contains a power-transmitting coil (not illustrated) and is disposed on a road surface in a parking space (see FIG. 1 and FIG. 7).

The power-transmitting circuit 32 includes an AC power supply, a converter, and an inverter (these are not illustrated) and performs the magnetic resonance method for power transmission from the power-transmitting coil (not illustrated) in the power-transmitting unit 31 to a power-receiving coil (not illustrated) in the power-receiving unit 20.

The wireless communication device 33 includes an antenna, not illustrated and outputs a wireless signal by using the antenna. The wireless communication device 33 establishes wireless communication in a wireless LAN method with a wireless communication device 26 in the vehicle 2 during parking assistance control as described later.

The controller 30 includes a microcomputer that includes a CPU, a RAM, a ROM, and an I/O interface circuit (these are not illustrated). The controller 30 controls the power transmission of the power-transmitting circuit 32 and controls the wireless communication of the wireless communication device 33.

Figure 3:
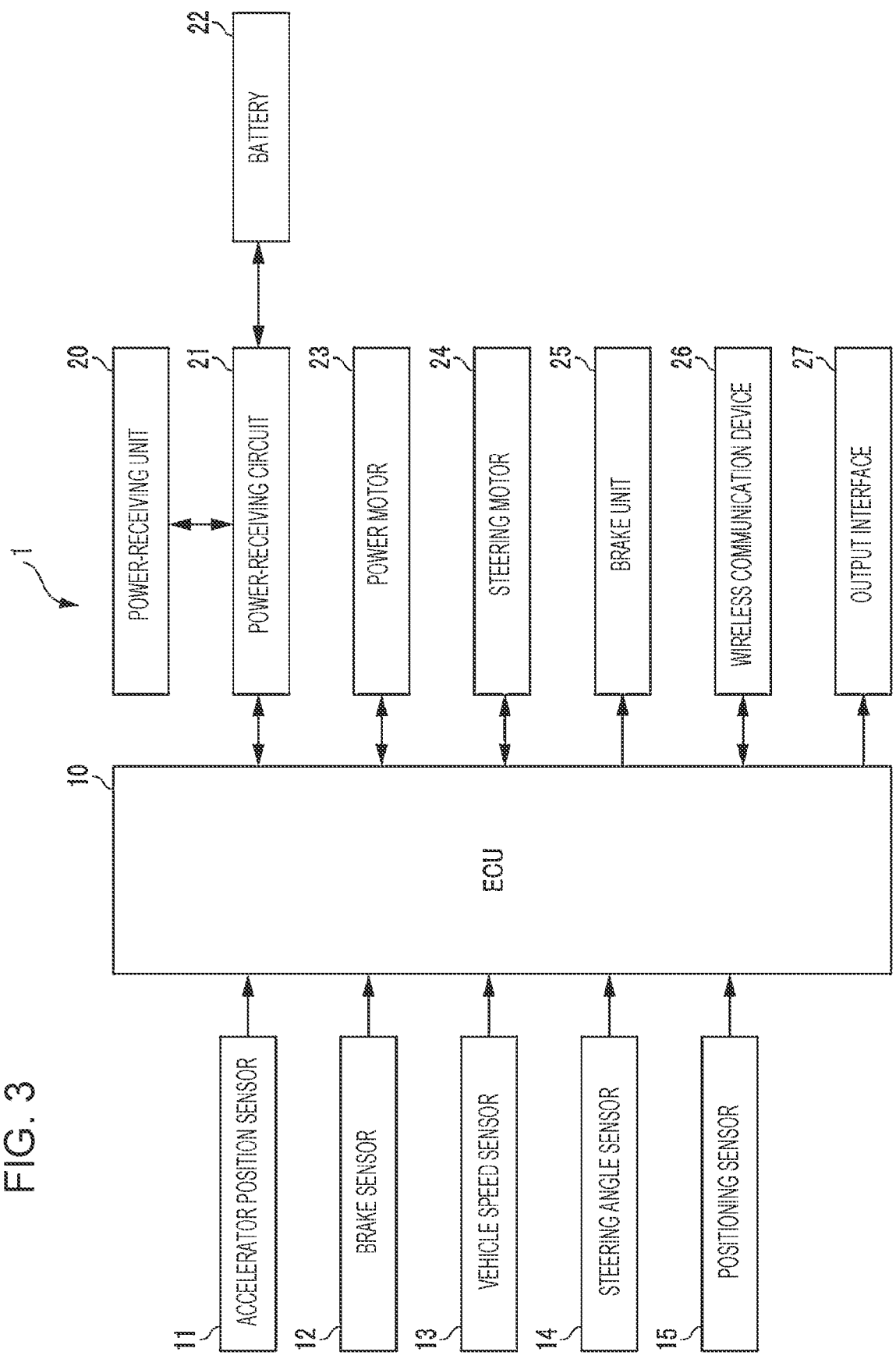
FIG. 3 illustrates a block diagram of the structure of the parking assistance apparatus.

As illustrated in FIG. 3, the parking assistance apparatus 1 includes an ECU 10. The ECU 10 is mounted on the vehicle 2 and includes a microcomputer that includes a CPU, a RAM, a ROM, and an I/O interface circuit (these are not illustrated).

An accelerator position sensor 11, a brake sensor 12, a vehicle speed sensor 13, a steering angle sensor 14, and a positioning sensor 15 are electrically connected to the ECU 10. The accelerator position sensor 11 detects an amount AP (referred to below as an "accelerator position") in which an acceleration pedal, not illustrated, in the vehicle 2 is pushed and outputs a detection signal that represents the accelerator position to the ECU 10. According to the present embodiment, the accelerator position sensor 11 corresponds to an accelerator-operation-amount-obtaining unit, and the accelerator position AP corresponds to an accelerator operation amount.

The brake sensor 12 is a switch-type sensor that is included in a brake pedal mechanism, not illustrated, detects the state of the pushed brake pedal, and outputs a detection signal that represents the state to the ECU 10. Specifically, the brake sensor 12 outputs, as the detection signal, an ON signal if the brake pedal is pushed in a predetermined amount or more and outputs, as the detection signal, an OFF signal if not.

The vehicle speed sensor 13 detects the speed (referred to below as the "vehicle speed") VP of the vehicle 2 and outputs a detection signal that represents the vehicle speed to the ECU 10. The steering angle sensor 14 detects the steering angle θs of a handle, not illustrated and outputs a detection signal that represents the steering angle to the ECU 10.

The positioning sensor 15 includes a GPS, detects the coordinate values (the latitude and longitude) of the power-receiving unit 20 of the vehicle 2 in a world coordinate system, based on a GPS signal and outputs a detection signal that represents the coordinate values to the ECU 10. According to the present embodiment, the positioning sensor 15 corresponds to a relative-position-obtaining unit.

The vehicle 2 also includes the power-receiving unit 20, a power-receiving circuit 21, the power motor 23, a steering motor 24, a brake unit 25, the wireless communication device 26, and an output interface 27. The power-receiving unit 20 is disposed on the bottom surface of the vehicle 2 and is electrically connected to the power-receiving circuit 21.

The power-receiving circuit 21 includes, for example, a capacitor and a rectifier circuit and is electrically connected to the ECU 10. The ECU 10 controls the power-receiving circuit 21 during charging, and the battery 22 is charged with the power that is transmitted from the power-transmitting coil of the power-transmitting unit 31 to the power-receiving coil of the power-receiving unit 20.

The power motor 23 is an electric motor that serves as the power source of the vehicle 2 and is electrically connected to the ECU 10. The ECU 10 implements power running control and regenerative control of the power motor 23 depending on, for example, the accelerator position AP and the vehicle speed VP while the vehicle 2 is running.

The steering motor 24 changes the actual steering angles of the front wheels 2a, is included in a steering mechanism, not illustrated, and is electrically connected to the ECU 10. The ECU 10 controls the actual steering angles of the front wheels 2a by driving the steering motor 24, based on the steering angle θs.

The brake unit 25 includes, for example, a hydraulic control circuit and a hydraulic disc brake mechanism (these are not illustrated). In the brake unit 25, the hydraulic pressure of the hydraulic control circuit is applied to the hydraulic disc brake mechanism when the brake pedal is pushed for braking against the wheels.

The hydraulic control circuit includes an electromagnetic spool valve (not illustrated). The electromagnetic spool valve is electrically connected to the ECU 10. The ECU 10 controls the electromagnetic spool valve to control the braking force of the brake unit 25 during the parking assistance control described later. According to the present embodiment, the brake unit 25 corresponds to a brake device.

The wireless communication device 26 is disposed near the power-receiving unit 20 and outputs a wireless signal by using an antenna, not illustrated. The wireless communication device 26 is electrically connected to the ECU 10, and the communication state thereof is controlled by the ECU 10.

The SSID and password of the wireless communication device 26 are stored in advance in the controller 30 of the power-transmitting device 3, pairing between the wireless communication device 26 and the wireless communication device 33 of the power-transmitting device 3 automatically starts when the position P2 of the power-receiving unit 20 described later becomes a position within a first range A1 (a range illustrated by dots in FIG. 7) as the vehicle 2 moves. This enables wireless LAN communication between the wireless communication device 26 and the wireless communication device 33.

The output interface 27 includes, for example, a speaker and a display and is electrically connected to the ECU 10. The speaker is controlled by the ECU 10 and outputs various sound signals to a cabin. The display is disposed on a meter panel (not illustrated) and displays various kinds of display information by being controlled by the ECU 10. According to the present embodiment, the output interface 27 corresponds to a report unit.

The ECU 10 controls the components 21, and 23 to 27 described above, based on the detection signals of the various sensors 11 to 15 described above to perform various control processes such as the parking assistance control process described below. According to the present embodiment, the ECU 10 corresponds to the relative-position-obtaining unit, a parking assistance control unit, a first-range-determining unit, a second-range-determining unit, a first assistance control unit, a second assistance control unit, and the report unit.

The parking assistance control process will now be described with reference to FIG. 4 to FIG. 6. The parking assistance control process is performed by the ECU 10 in a predetermined control cycle to assist the driver in performing the position adjustment parking of the vehicle 2.

Figure 4:
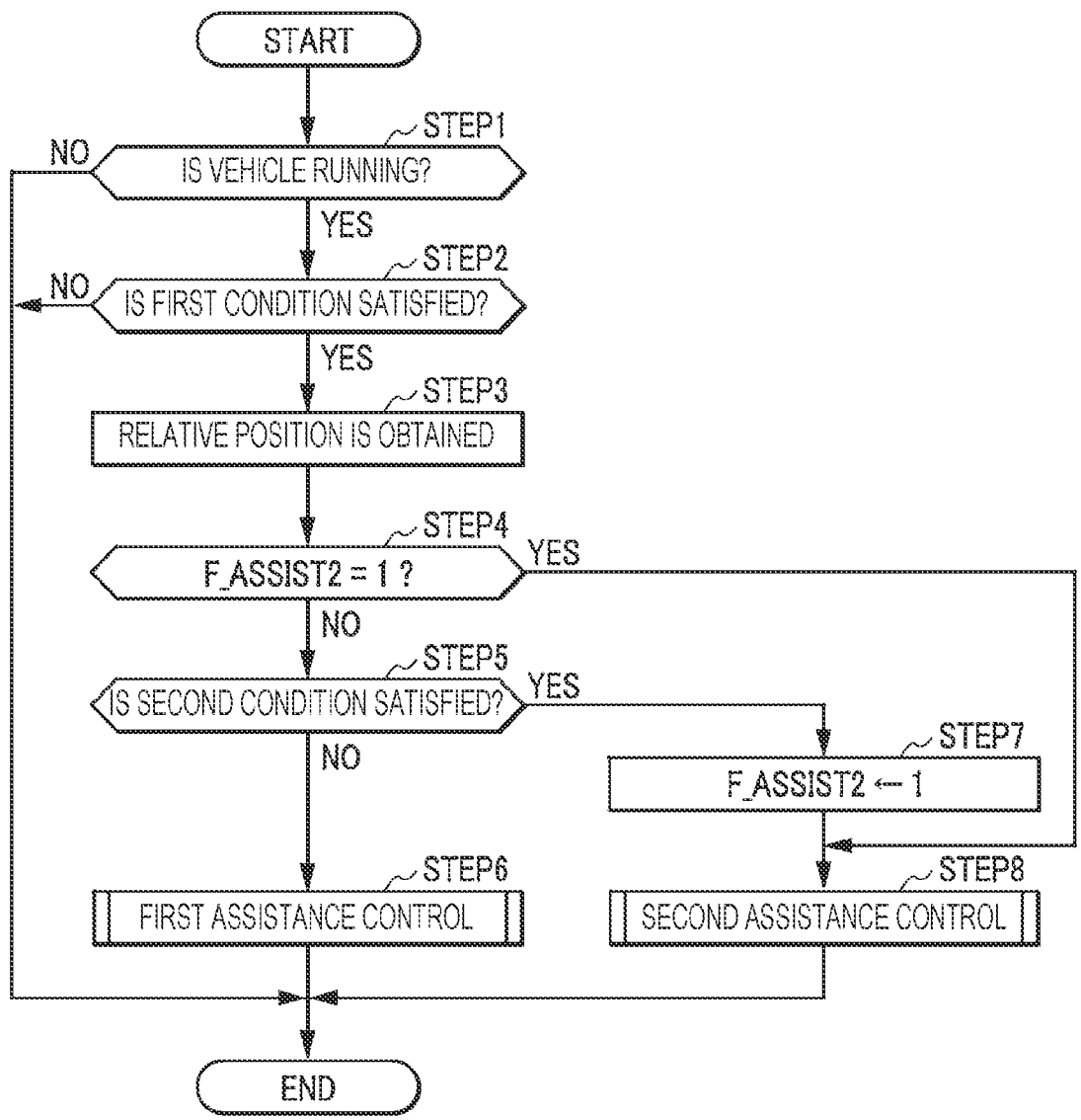
FIG. 4 is a flowchart illustrating a parking assistance control process.

As illustrated in FIG. 4, whether the vehicle 2 is running is first determined (STEP 1 in FIG. 4). In this case, it is determined that the vehicle 2 is stopped if the value of the vehicle speed VP is 0, and it is determined that the vehicle 2 is running if not.

If the determination is negative (NO at STEP 1 in FIG. 4), and the vehicle 2 is stopped, this process ends. If the determination is positive (YES at STEP 1 in FIG. 4), and the vehicle 2 is running, whether a first condition is satisfied is determined (STEP 2 in FIG. 4).

In this case, it is determined that the first condition is satisfied if the wireless communication device 26 of the parking assistance apparatus 1 and the wireless communication device 33 of the power-transmitting device 3 are paired, and it is determined that the first condition is not satisfied if not.

If the determination is negative (NO at STEP 2 in FIG. 4), and the first condition is not satisfied, this process ends. If the determination is positive (YES at STEP 2 in FIG. 4), and the first condition is satisfied, a relative position is obtained (STEP 3 in FIG. 4).

The relative position is a relative position of the power-receiving unit 20 with respect to the power-transmitting unit 31 and is obtained in the following manner. The ECU 10 first obtains the position P1 (see FIG. 7 to FIG. 9) of the power-transmitting unit 31 through the wireless LAN communication by using the two wireless communication devices 33 and 26. The position P1 of the power-transmitting unit 31 has coordinate values in the world coordinate system that correspond to the center of the power-transmitting unit 31 and is stored in advance in the ROM of the controller 30 of the power-transmitting device 3.

The position P2 of the power-receiving unit 20 is obtained as the coordinate values in the world coordinate system, based on the detection signal of the positioning sensor 15. The position P2 of the power-receiving unit 20 correspond to the center of the power-receiving unit 20. The relative position of the power-receiving unit 20 with respect to the power-transmitting unit 31 is obtained based on the positions P1 and P2.

Subsequently, whether a second assistance control flag F_ASSIST2 is "1" is determined (STEP 4 in FIG. 4). The second assistance control flag F_ASSIST2 represents whether a second assistance control process described later is being performed.

If the determination is positive (YES at STEP 4 in FIG. 4), and the second assistance control process is being performed with a previous control timing, the flow proceeds to STEP 8 described later. If the determination is negative (NO at STEP 4 in FIG. 4), and the second assistance control process is not being performed with the previous control timing, whether a second condition is satisfied is determined (STEP 5 in FIG. 4).

The second condition is a condition in which the second assistance control process is performed based on the relative position described above, as described below. That is, it is determined that the second condition is satisfied if the position P2 of the power-receiving unit 20 is within a second range (a range illustrated by hatching in FIG. 7 and FIG. 8) A2, and it is determined that the second condition is not satisfied if not. The second range A2 is set to a range in which the power-receiving unit 20 is nearer than that in the first range A1 described above to the power-transmitting unit 31.

If the determination is negative (NO at STEP 5 in FIG. 4), and the second condition is not satisfied, a first assistance control process is performed (STEP 6 in FIG. 4). Specifically, the first assistance control process is performed as illustrated in FIG. 5.

Figure 5:
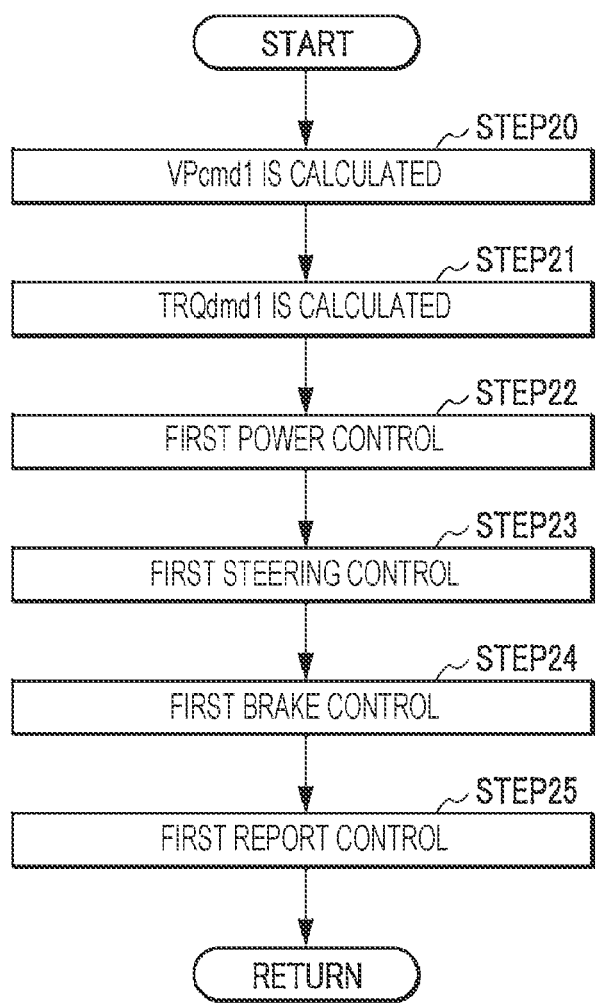
FIG. 5 is a flowchart illustrating a first assistance control process.

As illustrated in FIG. 5, a first target speed VPcmd1 is first calculated (STEP 20 in FIG. 5). In this case, the first target speed VPcmd1 is set to a predetermined first low speed value (for example, 30 km/h). The first target speed VPcmd1 may be calculated depending on the vehicle speed VP by searching a mapping, not illustrated.

Subsequently, a first required torque TRQdmd1 is calculated depending on the accelerator position AP and the first target speed VPcmd1 by searching a mapping, not illustrated (STEP 21 in FIG. 5).

In the mapping, the mapping value of the first required torque TRQdmd1 is set to a value that increases as the accelerator position AP increases. The mapping value of the first required torque TRQdmd1 is set to a value smaller than the mapping value in the case where the first condition is not satisfied with the accelerator position AP being the same.

Subsequently, the first power control process is performed (STEP 22 in FIG. 5). In the first power control process, the state of rotation of the power motor 23 is controlled based on the first required torque TRQdmd1. For example, when TRQdmd1>0 is satisfied, the power running control of the power motor 23 is implemented, and when TRQdmd1<0 is satisfied, the regenerative control of the power motor 23 is implemented. In the above manner, the vehicle speed VP is controlled so as to be equal to the first target speed VPcmd1, and the torque produced by the power motor 23 is controlled so as to be equal to the first required torque TRQdmd1.

After the first power control process is performed in the above manner, a first steering control process is performed (STEP 23 in FIG. 5). In the first steering control process, the steering motor 24 is controlled depending on the steering angle θs. In the first steering control process, the actual steering angles of the front wheels 2a with respect to the steering angle θs are controlled so as to be smaller than those in the steering control process when the first condition is not satisfied.

Subsequently, a first brake control process is performed (STEP 24 in FIG. 5). In the first brake control process, the braking force of the brake unit 25 is controlled based on the ON or OFF signal from the brake sensor 12. In the first brake control process, the braking force of the brake unit 25 is controlled so as to be more than that in the brake control process when the first condition is not satisfied.

Subsequently, a first report control process is performed (STEP 25 in FIG. 5). In the first report control process, a sound signal that represents "first assistance control starts" is outputted from the speaker of the output interface 27 to the cabin of the vehicle only when the first report control process is performed for the first time. In addition, a symbol and characters that represent this are displayed on the display of the output interface 27 in the first report control process. After the first report control process is performed in the above manner, this process ends.

Referring to FIG. 4 again, after the first report control process (STEP 6 in FIG. 4) is performed in the above manner, the parking assistance control process in FIG. 4 ends.

If the determination described above is positive (YES at STEP 5 in FIG. 4), and the second condition is satisfied, it is determined that the second assistance control process is to be performed, and the second assistance control flag F_ASSIST2 is set to "1" to represent this (STEP 7 in FIG. 4).

When the second assistance control flag F_ASSIST2 is thus set to "1", or the second assistance control process is being performed with the previous control timing (YES at STEP 4 in FIG. 4), the second assistance control process is performed (STEP 8 in FIG. 4). Specifically, the second assistance control process is performed as illustrated in FIG. 6.

Figure 6:
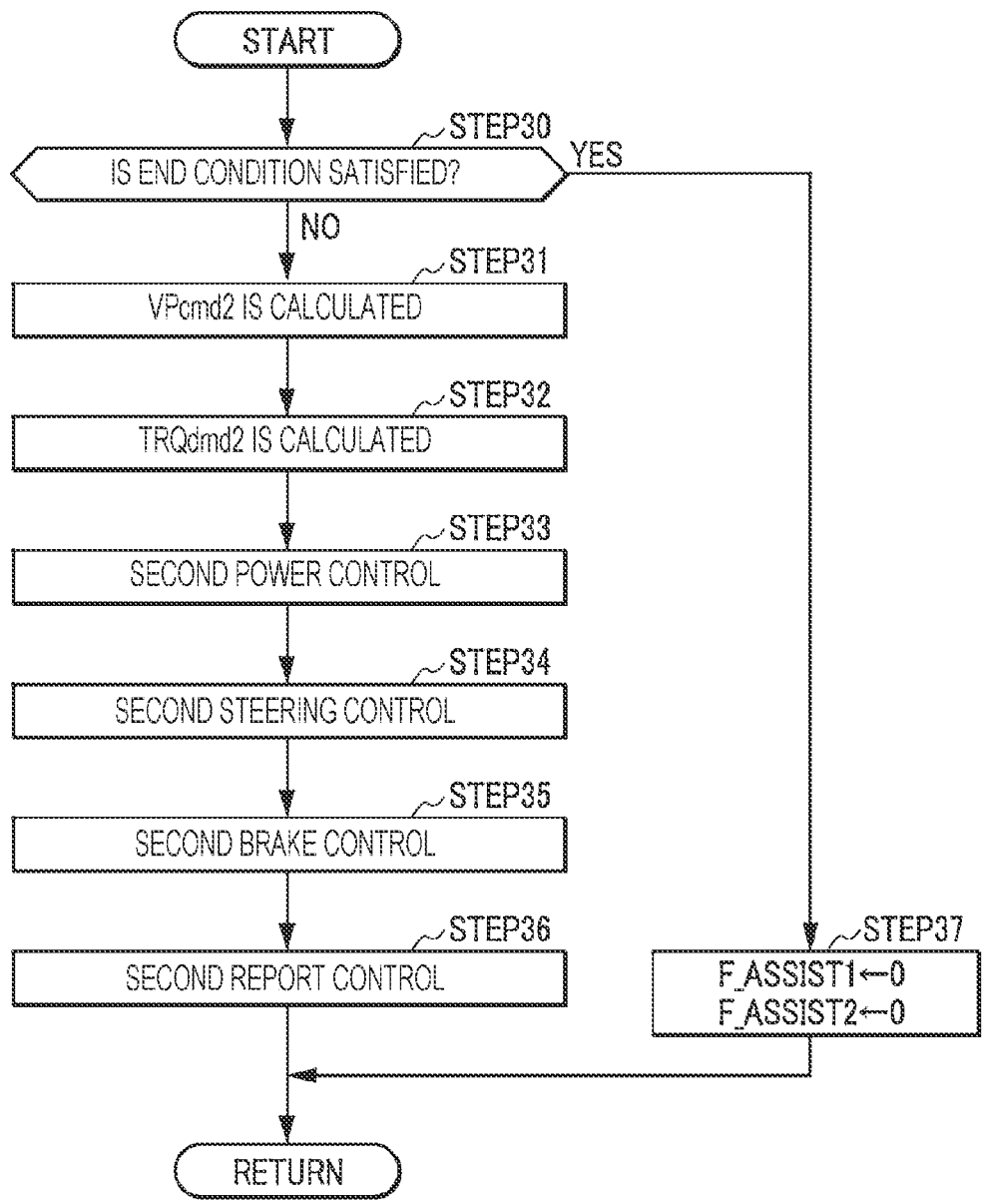
FIG. 6 is a flowchart illustrating a second assistance control process.

As illustrated in FIG. 6, whether an end condition for the second assistance control process is satisfied is first determined (STEP 30 in FIG. 6). In this case, it is determined that the end condition for the second assistance control process is satisfied if both of conditions (f1) to (f2) described below are satisfied, and it is determined that the end condition for the second assistance control process is not satisfied if not.

(f1) The power-receiving unit 20 has a relationship in relative position with respect to the power-transmitting unit 31 at which the power-receiving unit can receive the power.

(f2) The vehicle 2 is stopped.

Figure 9:
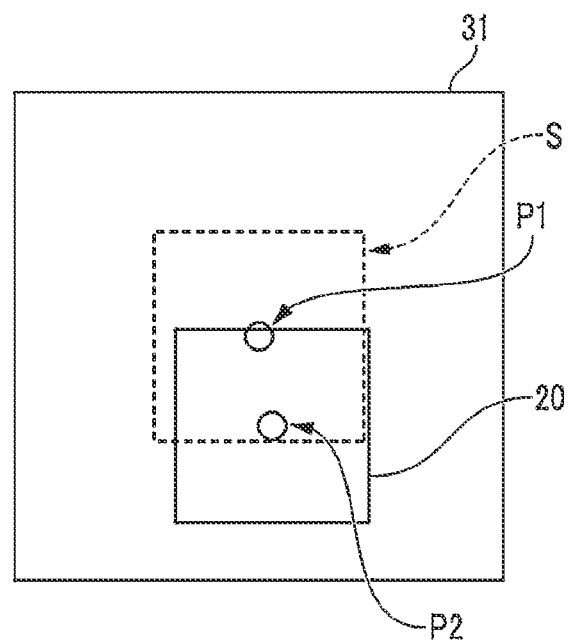
FIG. 9 illustrates the power-receiving unit that has a relationship in relative position with respect to the power-transmitting unit at which the power-receiving unit can receive power.

In this case, it is determined that the condition (f1) described above is satisfied if the position P2 of the power-receiving unit 20 is within a rectangular region (a region illustrated by a dashed line in FIG. 9) S the center of which coincides with the position P1 of the power-transmitting unit 31 as illustrated in FIG. 9.

If the determination is negative (NO at STEP 30 in FIG. 6), and the end condition for the second assistance control process is not satisfied, a second target speed VPcmd2 is calculated (STEP 31 in FIG. 6). In this case, the second target speed VPcmd2 is set to a predetermined second low speed value (for example, 10 km/h) lower than the predetermined first low speed value described above. The second target speed VPcmd2 may be calculated depending on the vehicle speed VP by searching a mapping, not illustrated.

Subsequently, a second required torque TRQdmd2 is calculated depending on the accelerator position AP and the second target speed VPcmd2 by searching a mapping, not illustrated (STEP 32 in FIG. 6).

In the mapping, the mapping value of the second required torque TRQdmd2 is set to a value that increases as the accelerator position AP increases. The mapping value of the second required torque TRQdmd2 is set to a value smaller than the mapping value of the first required torque TRQdmd1 with the accelerator position AP being the same.

Subsequently, a second power control process is performed (STEP 33 in FIG. 6). In the second power control process, the state of rotation of the power motor 23 is controlled based on the second required torque TRQdmd2. For example, when TRQdmd2>0 is satisfied, the power running control of the power motor 23 is implemented, and when TRQdmd2<0 is satisfied, the regenerative control of the power motor 23 is implemented.

After the second power control process is performed in the above manner, a second steering control process is performed (STEP 34 in FIG. 6). In the second steering control process, the steering motor 24 is controlled depending on the steering angle θs. In the second steering control process, the actual steering angles of the front wheels 2a with respect to the steering angle θs are controlled so as to be smaller than those in the first steering control process.

Subsequently, a second brake control process is performed (STEP 35 in FIG. 6). In the second brake control process, the braking force of the brake unit 25 is controlled based on the ON or OFF signal from the brake sensor 12. In the second brake control process, the braking force of the brake unit 25 is controlled so as to be more than that in the first brake control process.

Subsequently, a second report control process is performed (STEP 36 in FIG. 6). In the second report control process, a sound signal that represents "second assistance control starts" is outputted from the speaker of the output interface 27 to the cabin of the vehicle only when the second report control process is performed for the first time. In addition, a symbol and characters that represent this are displayed on the display of the output interface 27 in the second report control process. After the second report control process is performed in the above manner, this process ends.

If the determination described above is positive (YES at STEP 30 in FIG. 6), and the end condition for the second assistance control process is satisfied, a first assistance control flag F_ASSIST1 and the second assistance control flag F_ASSIST2 described above are set to "0" (STEP 37 in FIG. 6). This process then ends.

Referring to FIG. 4 again, after the second report control process (STEP 8 in FIG. 4) is performed in the above manner, the parking assistance control process in FIG. 4 ends.

As for the parking assistance apparatus 1 according to the present embodiment described above, while the wireless communication device 26 of the parking assistance apparatus 1 and the wireless communication device 33 of the power-transmitting device 3 are paired, that is, the position P2 of the power-receiving unit 20 is within the first range A1

(see FIG. 7), the ECU 10 obtains the relative positions of the power-receiving unit 20 and the power-transmitting unit 31.

Subsequently, whether the position P2 of the power-receiving unit 20 is within the second range A2 is determined based on the relative positions. If the position P2 of the power-receiving unit 20 is not within the second range A2, but is within the first range A1, the first assistance control process is performed. In the first assistance control process, the first required torque TRQdmd1 is calculated depending on the accelerator position AP and the first target speed VPcmd1, the first power control process is performed, and the torque produced by the power motor 23 is controlled so as to be equal to the first required torque TRQdmd1.

The first target speed VPcmd1 is set to a value smaller than that in the case where the first condition is not satisfied with the accelerator position AP being the same. Accordingly, the torque produced by the power motor 23 is reduced in the first assistance control process unlike that when the first assistance control process is not performed. In addition, the first target speed VPcmd1 is set to the predetermined first low speed value, and the vehicle speed VP is consequently controlled so as to be in a vehicle speed range lower than that in the case where the first condition is not satisfied.

In the first steering control process, the actual steering angles of the front wheels 2a with respect to the steering angle θs are controlled so as to be smaller than those in the steering control process when the first steering control process is not performed. In addition, in the first brake control process, the braking force of the brake unit 25 is controlled so as to be more than that in the brake control process when the first steering control process is not performed.

The first assistance control process is performed in the case where the position P2 of the power-receiving unit 20 is within the first range A1, and any driver's switch operation, for example, is not included in requirements, as described above. Consequently, the vehicle 2 is automatically controlled such that the displacement of the vehicle 2 per unit time is less than that in the case where the position P2 is not within the first range A1. Consequently, the vehicle 2 can be appropriately parked while influence caused in the case where the driver performs a rough driving operation, or the driving performance of the driver is low is inhibited in the first assistance control process.

When the first report control process starts, the sound signal that represents the "first assistance control starts" is outputted from the speaker of the output interface 27 to the cabin of the vehicle, and the symbol and characters that represent that the first report control process is being performed are displayed on the display of the output interface 27 in the first report control process. Consequently, the driver of the vehicle 2 does not feel strange when the displacement of the vehicle 2 per unit time decreases due to the first assistance control process. As a result, a high degree of customer satisfaction can be ensured.

While the position P2 of the power-receiving unit 20 is within the second range A2, the second assistance control process is performed. In the second assistance control process, the second required torque TRQdmd2 is calculated depending on the accelerator position AP and the second target speed VPcmd2, the second power control process is performed, and the torque produced by the power motor 23 is consequently controlled so as to be equal to the second required torque TRQdmd2.

The second target speed VPcmd2 is set to a value smaller than that in the first assistance control process with the accelerator position AP being the same.

Accordingly, in the second power control process, the torque produced by the power motor 23 is reduced more than that in the first power control process. In addition, the second target speed VPcmd2 is set to the predetermined second low speed value smaller than the predetermined first low speed value. Accordingly, the vehicle speed VP is controlled so as to be in a vehicle speed range lower than that in the first power control process.

In the second steering control process, the actual steering angles of the front wheels 2a with respect to the steering angle θs are controlled so as to be smaller than those in the first steering control process. In the second brake control process, the braking force of the brake unit 25 is controlled so as to be more than that in the first brake control process.

In the case where the position P2 of the power-receiving unit 20 is within the second range A2, the second assistance control process is automatically performed as described above. Consequently, the vehicle 2 is automatically controlled such that the displacement of the vehicle 2 per unit time is less than that while the position P2 is within the first range A1 and out of the second range A2, that is, in the first assistance control process. Consequently, the vehicle 2 can be parked while the influence caused in the case where the driver performs a rough driving operation, or the driving performance of the driver is low is inhibited during the second assistance control more than in the first assistance control process. As a result, the vehicle can be parked while the position of the power-receiving unit 20 with respect to the power-transmitting unit 31 is readily adjusted, and the accuracy of the position adjustment can be improved.

When the second report control process starts, the sound signal that represents the "second assistance control starts" is outputted from the speaker of the output interface 27 to the cabin of the vehicle, and the symbol and characters that represent that the second report control process is being performed are displayed on the display of the output interface 27 in the second report control process. Consequently, the driver of the vehicle 2 does not feel strange when the displacement of the vehicle 2 per unit time decreases due to the second assistance control process up to a lower level than that in the first assistance control process. As a result, a high degree of customer satisfaction can be ensured.

According to the embodiment, a four-wheel vehicle is used as an example of the vehicle. The vehicle according to the present disclosure, however, is not limited thereto but may be a vehicle that includes three or less wheels, or five or more wheels.

According to the embodiment, the ECU 10 and the positioning sensor 15 are used as an example of the relative-position-obtaining unit. The relative-position-obtaining unit according to the present disclosure, however, is not limited thereto, provided that the relative-position-obtaining unit obtains the relative positions of the power-receiving unit and the power-transmitting unit.

For example, a wireless communication device that is included in the power-receiving unit 20 and a wireless communication device that is included in the power-transmitting unit 31 may be used as the relative-position-obtaining unit, and the relative positions may be obtained through wireless communication between the wireless communication devices. A camera and the ECU 10 may be used as the relative-position-obtaining unit, the camera may image the power-transmitting unit 31, and the ECU 10 may obtain the relative positions from image data thereof by using an image recognition method.

Figure 7:
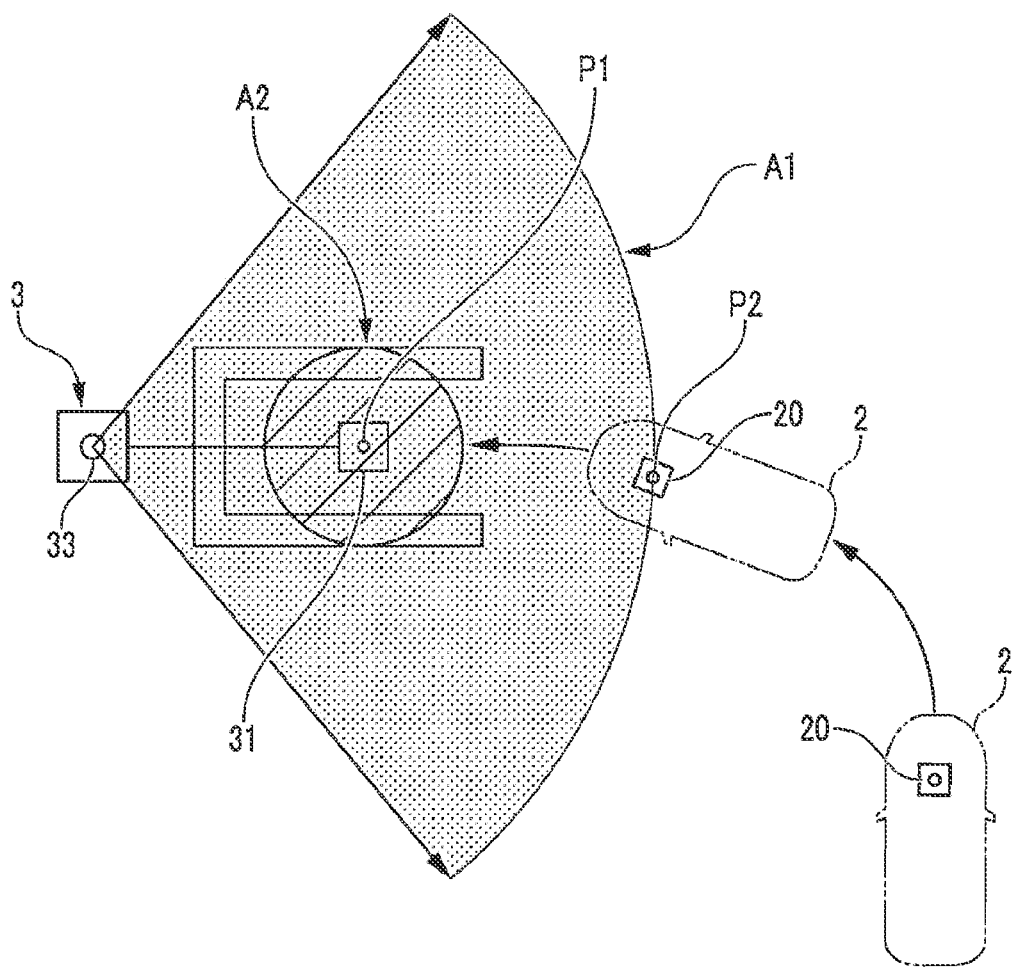
FIG. 7 illustrates a positional relationship between a power-receiving unit and a power-transmitting unit.

According to the embodiment, the first range A1 illustrated in FIG. 7 is used as an example of the first range. The first range according to the present disclosure, however, is not limited thereto, provided that the relative positions of the power-receiving unit and the power-transmitting unit are obtainable in the first range.

Figure 8:
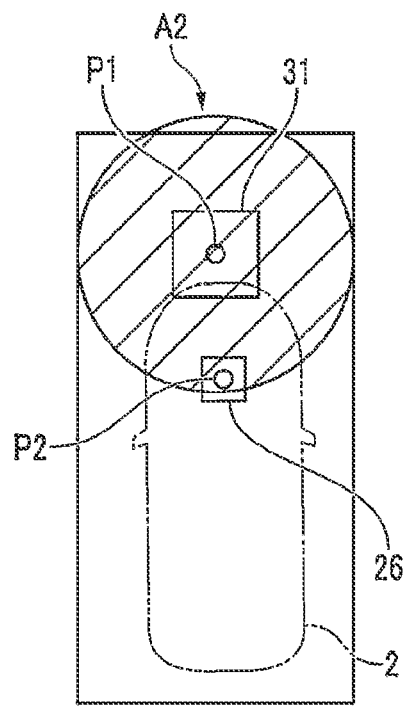
FIG. 8 illustrates the power-receiving unit within a second range.

According to the embodiment, the second range A2 illustrated in FIG. 7 and FIG. 8 is used as an example of the second range. The second range according to the present disclosure, however, is not limited thereto, provided that the power-receiving unit in the second range is nearer than that in the first range to the power-transmitting unit.

According to the embodiment, the acceleration pedal is used as an example of the acceleration device. The acceleration device according to the present disclosure, however, is not limited thereto, provided that the acceleration device is operated by the driver when the driver intends to accelerate the vehicle. In the case of, for example, a two-wheel vehicle, a throttle lever may be used as the acceleration device.

According to the embodiment, the power motor 23 is used as an example of the power source. However, the power source may be a combination of an electric motor and an internal combustion engine instead.

According to the embodiment, the output interface 27 is used as an example of the report unit. The report unit according to the present disclosure, however, is not limited thereto, provided that the report unit reports that the first assistance control or the second assistance control is performed to the cabin of the vehicle. For example, the report unit may be a display, a speaker, or a 3D-hologram device that is disposed in the cabin of the vehicle. The report unit may be a smartphone or a mobile terminal instead of a vehicle-mounted device.

In an example according to the embodiment, the parking assistance control process is performed by the single ECU 10. The parking assistance control process may be performed in corporation with multiple ECUs instead. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A parking assistance apparatus comprising:
a relative-position-obtaining unit that obtains a relative position of a power-receiving unit that is mounted on a vehicle to a power-transmitting unit that transmits power to the power-receiving unit in a non-contact manner; and
a parking assistance control unit that implements parking assistance control for assistance in parking of the vehicle, based on the relative position, while adjusting the position of the power-receiving unit with respect to the power-transmitting unit,
wherein the parking assistance control unit comprises:
a first-range-determining unit that determines whether the power-receiving unit is within a first range in which the relative position of the power-receiving unit to the power-transmitting unit is obtainable,
a second-range-determining unit that determines whether the power-receiving unit is within a second range in which the power-receiving unit is positioned nearer than that in the first range to the power-transmitting unit when the first-range-determining unit determines that the power-receiving unit is within the first range,
a first assistance control unit that implements, when the first-range-determining unit determines that the power-receiving unit is within the first range, as the parking assistance control, first assistance control for controlling the vehicle such that a displacement of the vehicle per unit time is less than that in case where it is determined that the power-receiving unit is not within the first range, and
a second assistance control unit that implements, when the second-range-determining unit determines that the power-receiving unit is within the second range, as the parking assistance control, second assistance control for controlling the vehicle such that the displacement of the vehicle per unit time is less than that during implementing the first assistance control,
wherein the vehicle includes a brake device that outputs braking force of the vehicle in case where a driver of the vehicle performs a braking operation, and
wherein during implementing the second assistance control, the second assistance control unit controls the brake device such that an output ratio of the braking force with respect to the braking operation is higher than that during implementing the first assistance control.

2. The parking assistance apparatus according to claim 1, further comprising:
a report unit that reports that the first assistance control or the second assistance control is implemented to a cabin of the vehicle during implementing the first assistance control or the second assistance control.

3. The parking assistance apparatus according to claim 1, wherein during implementing the second assistance control, the second assistance control unit controls the vehicle such that a speed of the vehicle is in a speed range lower than that during implementing the first assistance control.

4. The parking assistance apparatus according to claim 1, wherein the vehicle includes:
an accelerator-operation-amount-obtaining unit that obtains an accelerator operation amount that represents an amount of an operation of an acceleration device that is performed by a driver of the vehicle, and
a power source that outputs driving force of the vehicle according to the accelerator operation amount,
wherein during implementing the second assistance control, the second assistance control unit controls the power source such that an output ratio of the driving force to the accelerator operation amount is lower than that during implementing the first assistance control.

5. The parking assistance apparatus according to claim 1, wherein the first range is a range in which the power-receiving unit is paired with the power-transmitting unit via wireless communication.

6. The parking assistance apparatus according to claim 1, wherein the first assistance control unit automatically initiates the first assistance control when the first-range-determining unit determines that the power-receiving unit is within the first range.

7. The parking assistance apparatus according to claim 1, wherein the second range is located inside the first range.

8. A vehicle comprising the parking assistance apparatus according to claim 1.

9. A mobile device comprising the parking assistance apparatus according to claim 1.

10. A non-contact charging device comprising the parking assistance apparatus according to claim 1 and the power-transmitting unit according to claim 1.

11. A parking assistance method comprising steps of:
(i) obtaining, by a computer, a relative position of a power-receiving unit that is mounted on a vehicle to a power-transmitting unit that transmits power to the power-receiving unit in a non-contact manner; and
(ii) implementing, by a computer, parking assistance control for assistance in parking of the vehicle, based on the relative position, while adjusting the position of the power-receiving unit with respect to the power-transmitting unit,
wherein the step (ii) comprises:
determining whether the power-receiving unit is within a first range in which the relative position of the power-receiving unit to the power-transmitting unit is obtainable,
determining whether the power-receiving unit is within a second range in which the power-receiving unit is positioned nearer than that in the first range to the power-transmitting unit when it is determined that the power-receiving unit is within the first range,
when it is determined that the power-receiving unit is within the first range, implementing, as the parking assistance control, first assistance control for controlling the vehicle such that a displacement of the vehicle per unit time is less than that in case where it is determined that the power-receiving unit is not within the first range, and
when it is determined that the power-receiving unit is within the second range, implementing, as the parking assistance control, second assistance control for controlling the vehicle such that the displacement of the vehicle per unit time is less than that during implementing the first assistance control,
wherein the vehicle includes a brake device that outputs braking force of the vehicle in case where a driver of the vehicle performs a braking operation, and
wherein during implementing the second assistance control, the second assistance control unit controls the brake device such that an output ratio of the braking force with respect to the braking operation is higher than that during implementing the first assistance control.

12. A parking assistance apparatus comprising:
a relative-position-obtaining unit that obtains a relative position of a power-receiving unit that is mounted on a vehicle to a power-transmitting unit that transmits power to the power-receiving unit in a non-contact manner; and
a parking assistance control unit that implements parking assistance control for assistance in parking of the vehicle, based on the relative position, while adjusting the position of the power-receiving unit with respect to the power-transmitting unit,
wherein the parking assistance control unit comprises:
a first-range-determining unit that determines whether the power-receiving unit is within a first range in which the relative position of the power-receiving unit to the power-transmitting unit is obtainable,
a second-range-determining unit that determines whether the power-receiving unit is within a second range in which the power-receiving unit is positioned nearer than that in the first range to the power-transmitting unit when the first-range-determining unit determines that the power-receiving unit is within the first range,
a first assistance control unit that implements, when the first-range-determining unit determines that the power-receiving unit is within the first range, as the parking assistance control, first assistance control for controlling the vehicle such that a displacement of the vehicle per unit time is less than that in case where it is determined that the power-receiving unit is not within the first range, and
a second assistance control unit that implements, when the second-range-determining unit determines that the power-receiving unit is within the second range, as the parking assistance control, second assistance control for controlling the vehicle such that the displacement of the vehicle per unit time is less than that during implementing the first assistance control,
wherein the vehicle includes:
an accelerator-operation-amount-obtaining unit that obtains an accelerator operation amount that represents an amount of an operation of an acceleration device that is performed by a driver of the vehicle, and
a power source that outputs driving force of the vehicle according to the accelerator operation amount,
wherein during implementing the second assistance control, the second assistance control unit controls the power source such that an output ratio of the driving force to the accelerator operation amount is lower than that during implementing the first assistance control.

* * * * *